United States Patent
Kitajima et al.

(10) Patent No.: US 11,768,503 B2
(45) Date of Patent: Sep. 26, 2023

(54) POSITION ESTIMATION DEVICE, CONTROL DEVICE, INDUSTRIAL VEHICLE, LOGISTICS SUPPORT SYSTEM, POSITION ESTIMATION METHOD, AND PROGRAM

(71) Applicant: MITSUBISHI HEAVY INDUSTRIES, LTD., Tokyo (JP)

(72) Inventors: Katsumasa Kitajima, Tokyo (JP); Yusuke Kinouchi, Tokyo (JP); Takumi Fujita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 345 days.

(21) Appl. No.: 17/158,706

(22) Filed: Jan. 26, 2021

(65) Prior Publication Data

US 2021/0263530 A1   Aug. 26, 2021

(30) Foreign Application Priority Data

Feb. 25, 2020   (JP) .................................. 2020-029442

(51) Int. Cl.
*G06T 7/73* (2017.01)
*G06T 7/11* (2017.01)
(Continued)

(52) U.S. Cl.
CPC .......... *G05D 1/0231* (2013.01); *G01S 7/4817* (2013.01); *G01S 17/89* (2013.01);
(Continued)

(58) Field of Classification Search
None
See application file for complete search history.

(56) References Cited

U.S. PATENT DOCUMENTS 11,479,213 B1 * 10/2022 Kentley-Klay ........ G06V 20/70
2007/0199108 A1    8/2007 Angle et al.
(Continued)

FOREIGN PATENT DOCUMENTS

JP           5747191         5/2015
JP         2015-141580       8/2015
(Continued)

OTHER PUBLICATIONS

R. Barea et al., "Vehicle Detection and Localization using 3D LIDAR Point Cloud and Image Semantic Segmentation," 2018 21st International Conference on Intelligent Transportation Systems (ITSC), Maui, HI, USA, 2018, pp. 3481-3486, doi: 10.1109/ITSC.2018.8569962. (Year: 2018).*

*Primary Examiner* — Peter D Nolan
*Assistant Examiner* — Jacob Kent Besteman-Street
(74) *Attorney, Agent, or Firm* — Wenderoth, Lind & Ponack, L.L.P.

(57) ABSTRACT

A device is for estimating a position of a vehicle equipped with a laser scanner capable of acquiring point cloud data by scanning a laser beam and a camera capable of acquiring an image in a predetermined direction. The device includes an acquisition unit configured to acquire the point cloud data and the image, an estimation unit configured to estimate the position based on the point cloud data or the image, and an extraction unit configured to extract, from the point cloud data, valid point cloud data that is usable for estimating the position. The estimation unit is configured to estimate the position using: (i) the valid point cloud data if a number of pieces of valid point cloud data is equal to or greater than a predetermined number; and (ii) the image if the number of pieces of valid point cloud data is less than the predetermined number.

19 Claims, 11 Drawing Sheets

(51) Int. Cl.
    *G05D 1/02*     (2020.01)
    *G05D 1/00*     (2006.01)
    *G01S 17/89*     (2020.01)
    *G01S 17/931*     (2020.01)
    *G01S 7/481*     (2006.01)

(52) U.S. Cl.
    CPC .......... *G01S 17/931* (2020.01); *G05D 1/0088* (2013.01); *G05D 1/0212* (2013.01); *G06T 7/11* (2017.01); *G06T 7/73* (2017.01); *G06T 2207/10028* (2013.01); *G06T 2207/30252* (2013.01)

(56) References Cited

U.S. PATENT DOCUMENTS

| | | | |
|---|---|---|---|
| 2017/0075355 A1* | 3/2017 | Micks | G01S 19/45 |
| 2019/0113629 A1 | 4/2019 | Kang et al. | |
| 2019/0130601 A1* | 5/2019 | Kavulya | G06T 7/74 |
| 2019/0389658 A1* | 12/2019 | Kim | G06Q 10/04 |
| 2020/0126179 A1* | 4/2020 | Yan | G06T 5/20 |
| 2021/0150279 A1* | 5/2021 | Dudzik | G06V 20/58 |
| 2022/0087884 A1* | 3/2022 | Takei | B62K 17/00 |

FOREIGN PATENT DOCUMENTS

| | | |
|---|---|---|
| JP | 2018-84544 | 5/2018 |
| JP | 2019-74505 | 5/2019 |
| JP | 2016-103277 | 6/2021 |

\* cited by examiner

POSITION ESTIMATION DEVICE, CONTROL DEVICE, INDUSTRIAL VEHICLE, LOGISTICS SUPPORT SYSTEM, POSITION ESTIMATION METHOD, AND PROGRAM

CROSS-REFERENCE TO RELATED APPLICATIONS

This application claims the benefit of priority to Japanese Patent Application Number 2020-029442 filed on Feb. 25, 2020. The entire contents of the above-identified application are hereby incorporated by reference.

TECHNICAL FIELD

The present disclosure relates to a position estimation device, a control device, an industrial vehicle, a logistics support system, a position estimation method, and a program.

RELATED ART

Some industrial vehicles that are used indoors or partially outdoors cannot use a global navigation satellite system (GNSS). Therefore, some industrial vehicles are equipped with a sensor configured to estimate the position of the industrial vehicle.

SUMMARY

As sensor technology for self-position estimation, light detection and ranging (LiDAR) is known (for example, see JP 2019-074505 A). However, there is a problem in that self-position estimation becomes difficult when a laser beam is blocked by an obstacle (for example, another industrial vehicle or temporarily placed luggage) present in a work area.

An object of the present disclosure is to achieve more robust self-position estimation.

According to one aspect of the present disclosure, there is provided a position estimation device for estimating a position of an industrial vehicle equipped with a laser scanner capable of acquiring point cloud data by scanning a laser beam and a camera capable of acquiring an image in a predetermined direction, the device including: an acquisition unit configured to acquire the point cloud data and the image; an estimation unit configured to estimate the position of the industrial vehicle based on at least one of the point cloud data and the image; and an extraction unit configured to extract, from the point cloud data, valid point cloud data that is usable for estimating the position from the point cloud data. In a case where a number of pieces of the valid point cloud data is equal to or greater than a predetermined number, the estimation unit estimates the position of the industrial vehicle by using the valid point cloud data, and in a case where a number of pieces of the valid point cloud data is less than the predetermined number, the estimation unit estimates the position of the industrial vehicle by using the image.

In addition, according to another aspect of the present disclosure, there is provided a position estimation method for estimating a position of an industrial vehicle equipped with a laser scanner capable of acquiring point cloud data by scanning a laser beam and a camera capable of acquiring an image in a predetermined direction, the method including: a step of acquiring the point cloud data and the image; a step of estimating the position of the industrial vehicle based on at least one of the point cloud data and the image; and a step of extracting, from the point cloud data, valid point cloud data that is usable for estimating the position. In the step of estimating the position, the position of the industrial vehicle is estimated by using the valid point cloud data in a case where the number of pieces of valid point cloud data is equal to or greater than a predetermined number, and the position of the industrial vehicle is estimated by using the image in a case where the number of pieces of valid point cloud data is less than a predetermined number.

In addition, according to still another aspect of the present disclosure, there is provided a program that causes a computer in a position estimation device for estimating a position of an industrial vehicle equipped with a laser scanner capable of acquiring point cloud data by scanning a laser beam and a camera capable of acquiring an image in a predetermined direction, to execute a step of acquiring the point cloud data and the image, a step of estimating the position of the industrial vehicle based on at least one of the point cloud data and the image, and a step of extracting, from the point cloud data, valid point cloud data that is usable for estimating the position. In the step of estimating the position, the position of the industrial vehicle is estimated by using the valid point cloud data in a case where the number of pieces of valid point cloud data is equal to or greater than a predetermined number, and the position of the industrial vehicle is estimated by using the image in a case where the number of pieces of valid point cloud data is less than a predetermined number.

According to each of the above-described aspects, more robust self-position estimation can be achieved.

BRIEF DESCRIPTION OF DRAWINGS

The disclosure will be described with reference to the accompanying drawings, wherein like numbers reference like elements.

DESCRIPTION OF EMBODIMENTS

First Embodiment

Hereinafter, a position estimation device according to a first embodiment and an industrial vehicle including this position estimation device will be described with reference to FIGS. 1 to 6.

Overall Configuration of Logistics Support System

Figure 1:
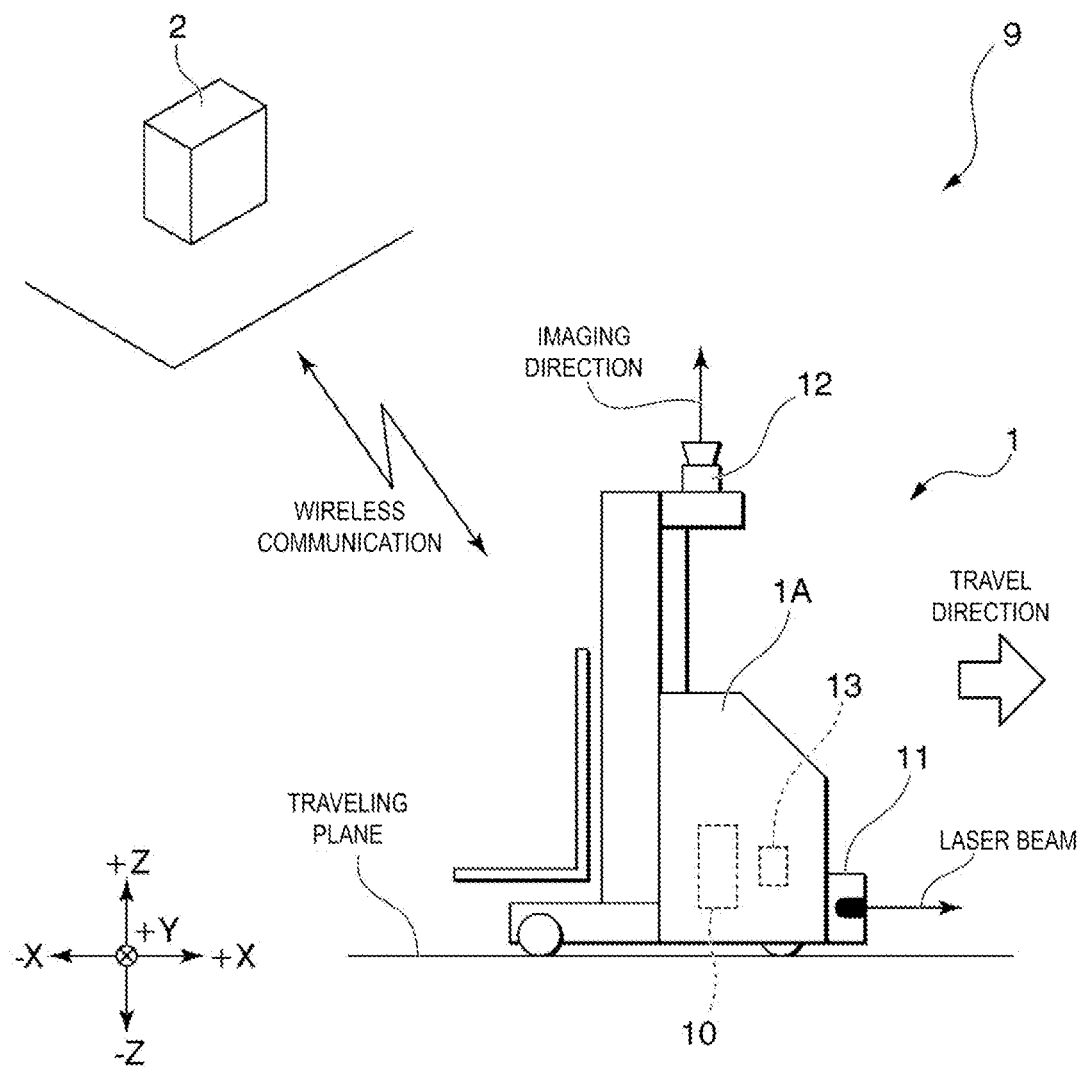
FIG. 1 is a view illustrating an overall configuration of a logistics support system according to an embodiment.

FIG. 1 is a view illustrating an overall configuration of a logistics support system according to the first embodiment.

A logistics support system 9 illustrated in FIG. 1 performs warehousing, delivery, and rearrangement of goods while controlling an industrial vehicle that travels autonomously (for example, unmanned forklift) in an indoor or semi-outdoor environment (for example, in a warehouse).

The logistics support system 9 includes an industrial vehicle 1 and a host device 2.

In the present embodiment, the industrial vehicle 1 is a vehicle that travels autonomously in accordance with a command received from the host device 2, and is, for example, an unmanned forklift.

The host device 2 outputs a command for traveling or loading and unloading, to the industrial vehicle 1. The host device 2 sequentially receives various information from the industrial vehicle 1 and aggregates a placement position of goods in the warehouse or the position of the industrial vehicle 1.

In the following description, an XY plane of a Cartesian coordinate system is referred to as a "traveling plane" of the industrial vehicle 1, and a ±Z-axis direction orthogonal to the traveling plane is also referred to as a "height direction". FIG. 1 illustrates an example in which the industrial vehicle 1 travels in the +X-axis direction on the traveling plane.

As illustrated in FIG. 1, the industrial vehicle 1 includes a vehicle main body 1A, a control device 10, a laser scanner 11, a camera 12, and an internal field sensor 13.

The control device 10 controls autonomous travel of the vehicle main body 1A. Specifically, the control device 10 controls the vehicle main body 1A to travel along a predetermined path while performing self-position estimation. The specific configuration and processing of the control device 10 will be described later.

The laser scanner 11 is 2D-LiDAR, for example. In the present embodiment, the laser scanner 11 serves as a safety sensor. In other words, the laser scanner 11, which is a safety sensor, is provided for the purpose of detecting obstacles on the travel path and causing the industrial vehicle 1 to perform an emergency stop for collision prevention. Specifically, the laser scanner 11 is attached to the lower side of the vehicle main body 1A and scans a laser beam over a predetermined scanning range including a travel direction. The laser beam is scanned along a plane parallel to the traveling plane. The laser scanner 11 is preferably attached at a height at which the laser scanner 11 can detect a person working in a posture lying on the traveling plane.

The laser scanner 11 scans the laser beam to acquire point cloud data indicating the direction and distance between the laser scanner 11 itself and an irradiation target of the laser beam.

The camera 12 is attached to an upper portion (+Z direction side) of the vehicle main body 1A so as to be capable of imaging the area above the vehicle main body 1A. The camera 12 captures and collects light from the outside through a lens to acquire an image (hereinafter, also referred to as a "visual field image") in a predetermined direction that, for example, shows a scene of the area above the vehicle main body 1A.

The internal field sensor 13 is, for example, an inertial measurement unit (IMU) and is a sensor capable of acquiring acceleration in three axes, angular velocity in three axes, and the like (hereinafter, also referred to as "acceleration/angular velocity information") of the vehicle main body 1A. In addition to the IMU, the internal field sensor 13 may be an encoder, a steering angle sensor, or the like configured to acquire the rotation angles of wheels.

Functional Configuration of Industrial Vehicle

Figure 2:
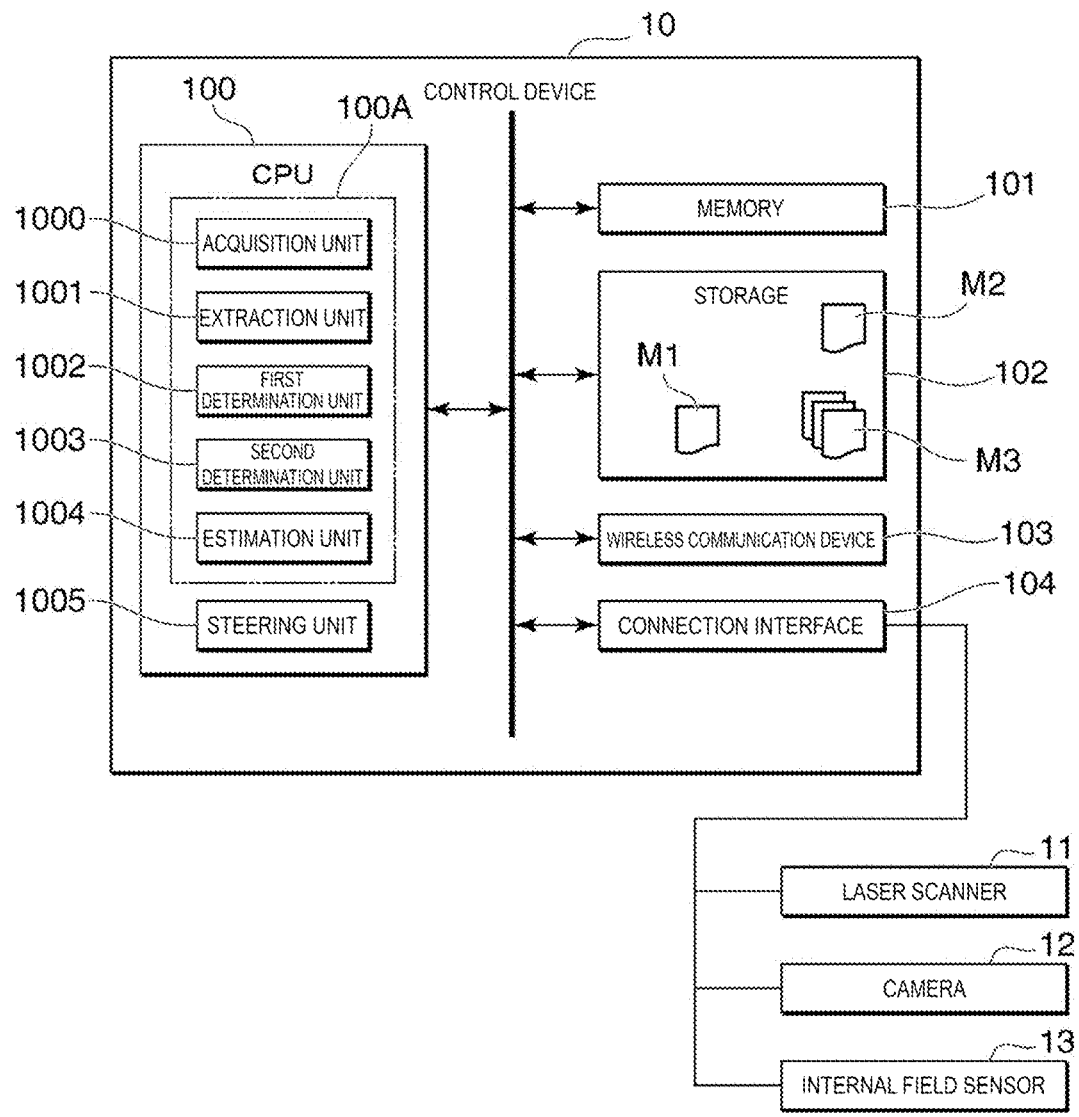
FIG. 2 is a view illustrating a functional configuration of an industrial vehicle according to an embodiment.

FIG. 2 is a view illustrating a functional configuration of the industrial vehicle according to the first embodiment.

As illustrated in FIG. 2, the control device 10 of the industrial vehicle 1 includes a CPU 100, a memory 101, a storage 102, a wireless communication device 103, and a connection interface 104.

The CPU 100 is a processor that operates in accordance with a program prepared in advance to perform various functions that will be described later.

The memory 101 is a so-called main storage device and is a storage region required for processing executed by the CPU 100.

The storage 102 is a so-called large-capacity auxiliary storage device, such as an HDD or an SSD. In the present embodiment, the storage 102 stores various information necessary for self-position estimation in advance. Specifically, the storage 102 stores warehouse map information M1, characteristic point map information M2, and camera-usable map information M3.

The warehouse map information M1 is map information used for matching the point cloud data obtained by the laser scanner 11 to specify a self-position.

The characteristic point map information M2 is map information including the previously obtained characteristic point clouds, and is used for matching characteristic points of the visual field image obtained by the camera 12 to specify the self-position.

The camera-usable map information M3 is map information used to determine whether to perform self-position estimation using the visual field image. In the present embodiment, the storage 102 stores a plurality of pieces of the camera-usable map information M3 to be used depending on the time zone.

The wireless communication device 103 is a communication interface configured to perform wireless communication with the host device 2 (FIG. 1).

The connection interface 104 is a connection interface configured to communicate with the control device 10, the laser scanner 11, the camera 12, and the internal field sensor 13.

Functions of the CPU 100 will be described in detail.

The CPU 100 operates in accordance with a program to function as an acquisition unit 1000, an extraction unit 1001, a first determination unit 1002, a second determination unit 1003, an estimation unit 1004, and a steering unit 1005. Among these, the acquisition unit 1000, the extraction unit 1001, the first determination unit 1002, the second determination unit 1003, and the estimation unit 1004 constitute the configuration of a position estimation device 100A configured to estimate the self-position of the industrial vehicle 1.

The acquisition unit 1000 acquires the point cloud data from the laser scanner 11 and the visual field image from the camera 12.

From the point cloud data acquired by the acquisition unit 1000, the extraction unit 1001 extracts valid point cloud data that can be used to estimate the self-position. Specific processing contents of the extraction unit 1001 will be described later.

The first determination unit 1002 determines whether to perform the estimation of the self-position using the point cloud data.

The second determination unit 1003 determines whether to perform the estimation of the self-position using the visual field image.

The estimation unit 1004 estimates the position (self-position) of the industrial vehicle 1 based on at least one of the point cloud data and the visual field image. The estimation unit 1004 appropriately selects the processing contents of the self-position estimation based on the determination results of the first determination unit 1002 and the second determination unit 1003.

The steering unit 1005 causes the industrial vehicle 1 to travel along a predetermined path based on the estimation result of the self-position by the position estimation device 100A.

Processing Flow of Control Device

Figure 3:
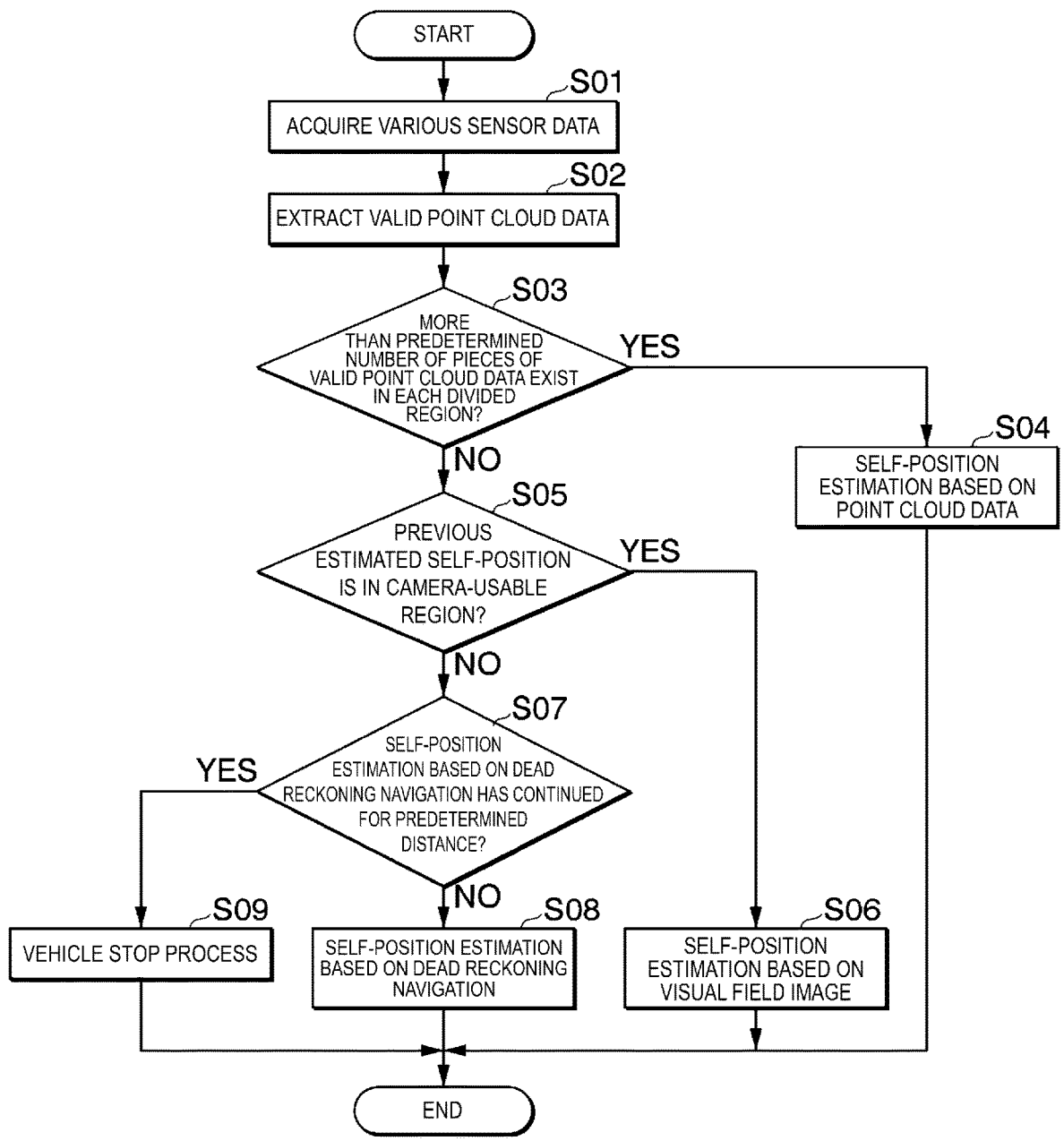
FIG. 3 is a view illustrating the processing flow of a control device according to an embodiment.

FIG. 3 is a view illustrating the processing flow of the control device according to the first embodiment.

Figure 4:
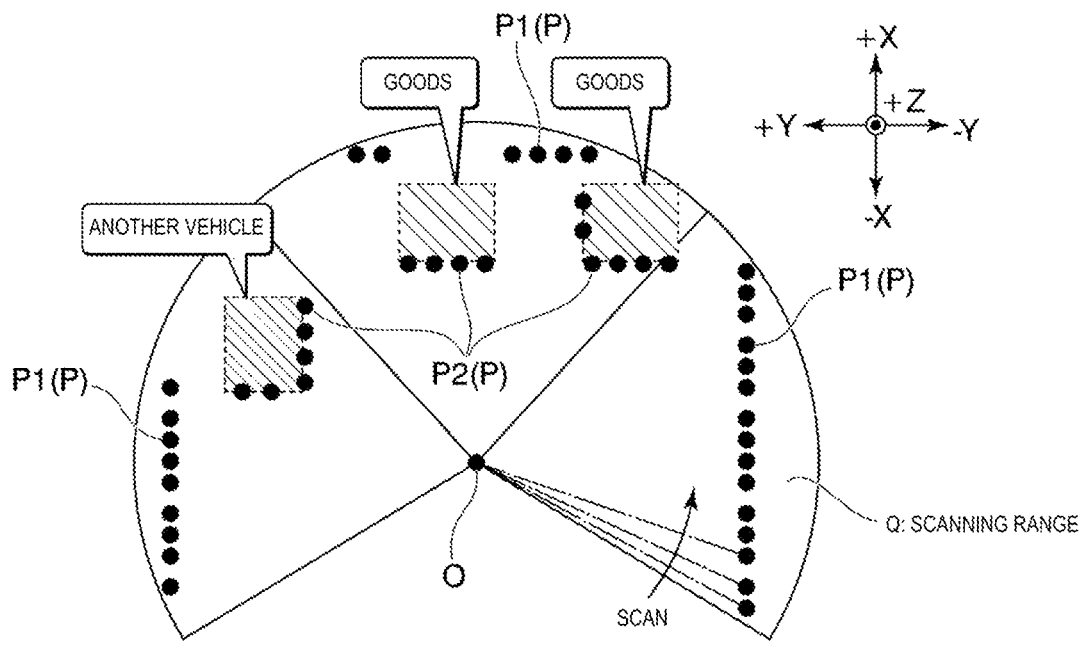
FIG. 4 is a view for describing processing of the control device according to an embodiment.
Figure 5:
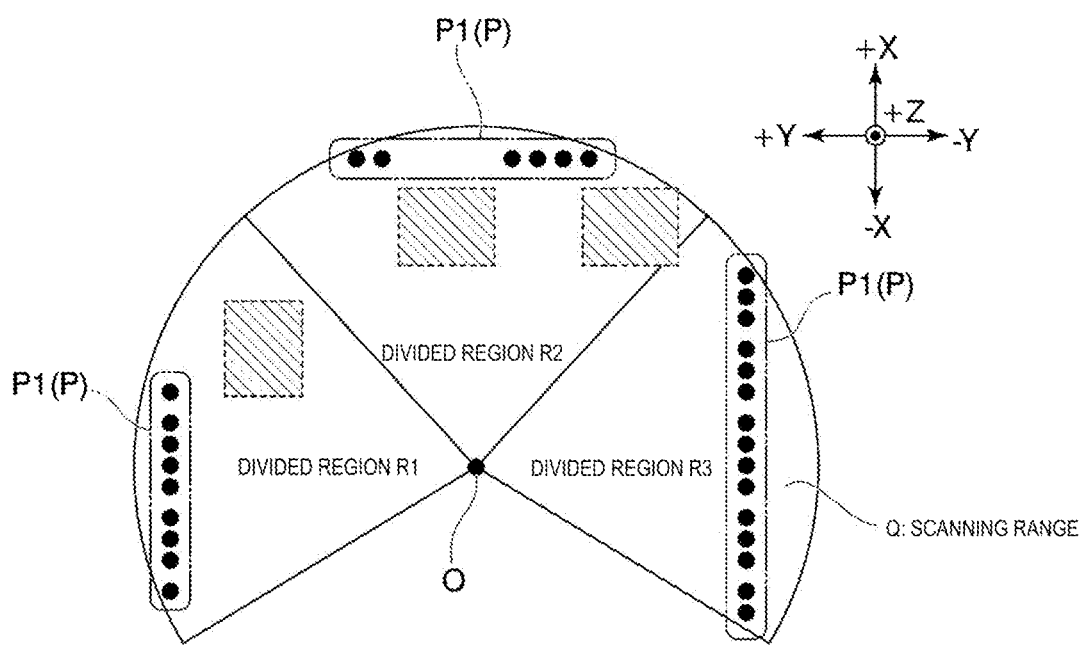
FIG. 5 is a view for describing processing of the control device according to an embodiment.
Figure 6:
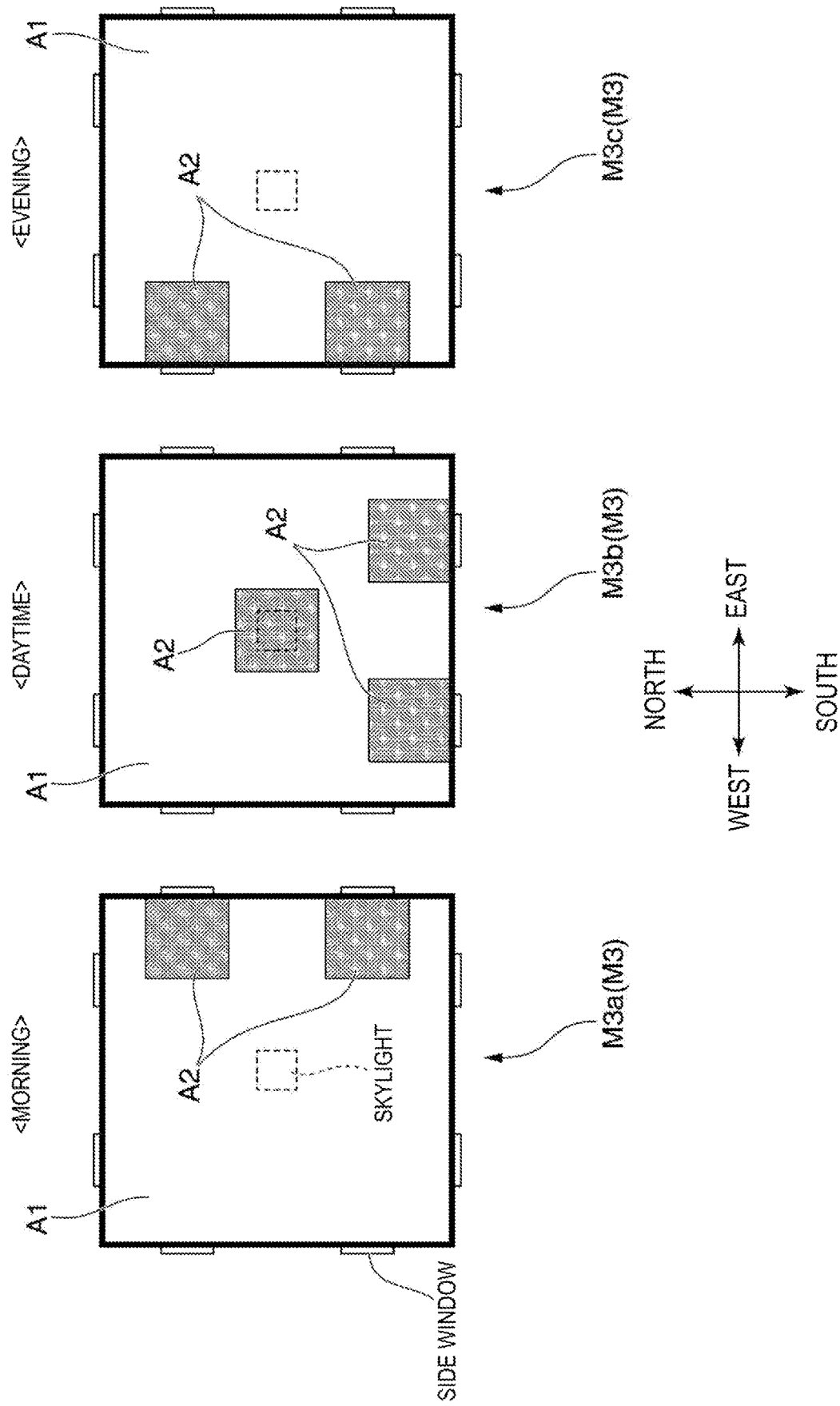
FIG. 6 is a view for describing processing of the control device according to an embodiment.

FIGS. 4 to 6 are views for describing processing of the control device according to the first embodiment.

The processing flow illustrated in FIG. 3 is iterated during travel of the industrial vehicle 1.

First, the acquisition unit 1000 of the control device 10 acquires various sensor data (step S01). Specifically, the acquisition unit 1000 acquires the point cloud data from the laser scanner 11, acquires the visual field image from the camera 12, and further acquires acceleration and angular velocity information from the internal field sensor 13.

Next, from the point cloud data acquired by the laser scanner 11, the extraction unit 1001 of the control device 10 extracts the valid point cloud data that can be used for self-position estimation (step S02). Now, the process of step S02 performed by the extraction unit 1001 will be described in detail with reference to FIGS. 4 and 5.

In FIGS. 4 and 5, the industrial vehicle 1 is traveling in the +X direction. An origin O is an origin position of the industrial vehicle 1 (laser scanner 11). As illustrated in FIG. 4, the laser scanner 11 repeatedly scans the laser beam along a predetermined scanning range Q. In addition, point cloud data P indicating the direction and distance between the self-position (origin O) and the irradiation target of the laser beam is acquired.

The point cloud data P is divided into point cloud data acquired by irradiating a constantly fixed object (for example, the warehouse wall or a shelf) and point cloud data acquired by irradiating a temporarily present object (for example, another industrial vehicle or temporarily placed goods).

When performing self-position estimation including the point cloud data acquired by irradiating the temporarily present object, the accuracy of self-position estimation is reduced. Here, among all of the point cloud data P acquired in step S01, the extraction unit 1001 excludes point cloud data acquired by irradiating the temporarily present object (hereinafter, also described as "invalid point cloud data P2"), and extracts the remaining point cloud data (hereinafter, also described as "valid point cloud data P1"). Because the valid point cloud data P1 is point cloud data acquired by irradiating the warehouse wall or a shelf, the valid point cloud data P1 is point cloud data that can be used to estimate the self-position. In other words, the control device 10 can accurately estimate the self-position by performing matching with the warehouse map information M1 based on only the valid point cloud data P1 extracted by the extraction unit 1001.

FIG. 5 illustrates a result of excluding the invalid point cloud data P2 from the point cloud data P, and extracting only the valid point cloud data P1.

A method for distinguishing whether each piece of point cloud data P is the valid point cloud data P1 (point cloud data derived from the warehouse wall or shelf) or the invalid point cloud data P2 (point cloud data derived from other industrial vehicles or temporarily placed goods), is as follows.

First, the extraction unit 1001 receives management information held by the host device 2. The management information held by the host device 2 is information indicating the location of each industrial vehicle and the placement position of the goods at the current time.

Next, the extraction unit 1001 excludes point cloud data derived from other industrial vehicles and point cloud data derived from temporarily placed goods, with reference to the self-position estimated in the previous stage and the management information received from the host device 2.

Returning to FIG. 3, the first determination unit 1002 of the control device 10 determines whether to perform self-position estimation using the valid point cloud data. Specifically, the first determination unit 1002 determines whether more than a predetermined number of pieces of valid point cloud data remain in each of the divided regions in the scanning range of the laser beam (step S03). The process of step S03 performed by the first determination unit 1002 will be described in detail with reference to FIG. 5.

As illustrated in FIG. 5, first, the first determination unit 1002 divides the scanning range Q of the laser beam into a plurality of regions. In the example illustrated in FIG. 5, the scanning range Q is divided into three regions (divided regions R1, R2, and R3). The divided region R1 is a region on the left side in the travel direction of the industrial vehicle 1 in the scanning range Q, the divided region R2 is a region in front of the industrial vehicle 1 in the scanning range Q, and the divided region R3 is a region on the right side in the travel direction of the industrial vehicle 1 in the scanning range Q.

Next, the first determination unit 1002 counts the number of pieces of the valid point cloud data P1 included in each of the divided regions R1, R2, and R3, and determines whether more than a predetermined number of pieces of the valid point cloud data P1 remain in all of the divided regions R1, R2, and R3.

Returning to FIG. 3, in a case where more than a predetermined number of pieces of valid point cloud data remain in each of the divided regions (step S03; YES), the estimation unit 1004 performs self-position estimation using the valid point cloud data after determining that accurate self-position estimation is possible based on the valid point cloud data (step S04).

Specifically, the estimation unit 1004 estimates the self-position by finding the layout (shape) of the wall or shelf extracted from the valid point cloud data acquired through steps S01 to S02 from the warehouse map information M1 recorded in advance.

On the other hand, in a case where no more than a predetermined number of pieces of valid point cloud data remains in each of the divided regions (step S03; NO), the control device 10 performs determination processing using the second determination unit 1003 after determining that accurate self-position estimation is not possible based on the valid point cloud data.

The second determination unit 1003 of the control device 10 determines whether to perform self-position estimation using the visual field image. Specifically, the second determination unit 1003 determines whether the previous estimated self-position belongs to a camera-usable region with reference to the camera-usable map information M3 (step S05). The process of step S05 performed by the second determination unit 1003 will be described in detail with reference to FIG. 6.

As illustrated in FIG. 6, the camera-usable map information M3 defines a camera-usable region A1 and a camera-unusable region A2.

The camera-unusable region A2 is a region where it is likely that the accuracy of self-position estimation based on the visual field image deteriorates. In addition, the camera-usable region A1 is a region other than the camera-unusable region A2 among all the regions in the warehouse.

In the present embodiment, the camera-unusable region A2 is defined as a region that is likely to receive direct sunlight based on the arrangement of the windows in the warehouse and the like. Therefore, the camera-unusable region A2 is defined as being in the vicinity of a side window or a skylight of the warehouse.

In addition, the amount of direct sunlight received is likely to vary depending on the time of day. Therefore, the control device 10 according to the present embodiment prepares a plurality of pieces of the camera-usable map information M3 (a morning map M3a, a daytime map M3b, and an evening map M3b), and changes the map to be referenced depending on the time of day.

In the morning map M3a illustrated in FIG. 6, the camera-unusable region A2 is defined as the vicinity of the eastern side window. In the daytime map M3b, the camera-unusable region A2 is defined as the vicinity of the southern side window and the vicinity of the area immediately below the skylight. Further, in the evening map M3c, the camera-unusable region A2 is defined as the vicinity of the western side window.

Changing the camera-usable map information (camera-usable region) to be referenced depending on the time of day as described above makes it possible to appropriately select the method for self-position estimation in consideration of the effects of direct sunlight or the like that changes depending on the time of day.

In addition, "changing depending on the time of day" includes not only changing depending on the time of day (morning, daytime, or evening) as in the present embodiment, but also changing depending on, for example, changes between seasons.

Returning to FIG. 3, in a case where the previous estimated position does not belong to the predefined camera-unusable region (step S05; YES), the estimation unit 1004 performs self-position estimation using the visual field image after determining that accurate self-position estimation is possible based on the visual field image (step S06).

Specifically, the estimation unit 1004 estimates the self-position based on the characteristic points of the visual field image acquired in step S01 and the characteristic point map information M2 prepared in advance, by using a simultaneous localization and mapping (SLAM) technique.

In addition, because the camera 12 is attached so as to face the area above the vehicle main body 1A as described above, it is unlikely that a temporary object (such as another industrial vehicle or temporarily placed goods) is included in the visual field image captured by the camera 12. Therefore, as long as the industrial vehicle 1 belongs to the camera-usable region A1, sufficiently accurate self-position estimation is possible using the visual field image.

On the other hand, in a case where the previous estimated position belongs to the predefined camera-unusable region (step S05; NO), the estimation unit 1004 performs self-position estimation by dead reckoning navigation (autonomous navigation) using the internal field sensor 13 after determining that accurate self-position estimation is not possible based on the visual field image.

However, errors accumulate in the dead reckoning navigation using the internal field sensor 13, and it is not preferable to continue the dead reckoning navigation for a predetermined traveling distance or longer. Therefore, the estimation unit 1004 first determines whether the dead reckoning navigation has continued for a predetermined distance or longer (step S07).

In a case where the dead reckoning navigation has not continued for a predetermined distance or longer (step S07; NO), the estimation unit 1004 performs self-position estimation based on the dead reckoning navigation (step S08).

In a case where the dead reckoning navigation has continued for a predetermined distance or longer (step S07; YES), the control device 10 (steering unit 1005) stops the vehicle from traveling (step S09).

Operational Effects

As described above, the position estimation device 100A (control device 10) according to the first embodiment estimates the position of the industrial vehicle by using the valid point cloud data in a case where the number of pieces of valid point cloud data is equal to or greater than a predetermined number, and estimates the position of the industrial vehicle by using the visual field image in a case where the number of pieces of valid point cloud data is less than a predetermined number.

In this manner, more accurate self-position estimation is possible using the valid point cloud data, and in a situation where sufficient valid point cloud data cannot be acquired, it is also possible to compensate with the self-position estimation using the visual field image.

As described above, according to the position estimation device 100A according to the present embodiment, more robust self-position estimation can be achieved.

Further, in the position estimation device 100A according to the first embodiment, in each of the plurality of divided regions R1 to R3 (refer to FIG. 5), in a case where the number of pieces of valid point cloud data belonging to each of the regions is equal to or greater than a predetermined number, the position of the industrial vehicle 1 is estimated using the valid point cloud data.

When the point cloud data is only biased to some limited regions, the possibility of incorrect matching between the point cloud data and the warehouse map information M1 is high. Here, by the above-described configuration, the self-position is estimated using the valid point cloud data that is evenly distributed across the scanning range, and thus, the accuracy of self-position estimation can be further increased.

The position estimation device 100A according to the first embodiment excludes the point cloud data derived from another industrial vehicle or goods from the acquired point cloud data, and extracts the remaining point cloud data as the valid point cloud data.

The point cloud data derived from a temporary object, such as another industrial vehicle and goods, may be noise when matching the point cloud data and the warehouse map information M1 in self-position estimation. Here, as described above, the self-position is estimated based on only the point cloud data derived from a permanent object (structure such as the wall or shelf), and thus, the accuracy of self-position estimation can be further increased.

The position estimation device 100A according to the first embodiment estimates the position of the industrial vehicle 1 by using the visual field image in a case where the number of pieces of valid point cloud data is less than a predetermined number and the previous estimated position belongs to the predefined camera-usable region A1 (in a case where the estimated position does not belong to the camera-unusable region A2).

In this manner, as long as the estimated position does not belong to the camera-unusable region in which accurate self-position estimation based on the visual field image becomes difficult, the self-position is estimated using the visual field image, and thus, it is possible to increase accuracy of self-position estimation by the visual field image.

In a case where the previous estimated position belongs to the predefined camera-unusable region A2 (refer to FIG. 6), the position estimation device 100A according to the first embodiment estimates the position of the industrial vehicle 1 by using the detection value of the internal field sensor 13 mounted on the industrial vehicle 1.

Thus, even in a case where accurate self-position estimation is difficult when using either the point cloud data or the visual field image, the self-position can be estimated by dead reckoning navigation using the detection value of the internal field sensor 13.

In addition, the control device 10 according to the first embodiment stops autonomous travel of the industrial vehicle 1 in a case where an obstacle is detected in the travel direction based on the point cloud data acquired by the laser scanner 11.

As described above, collision with the obstacle can be suppressed. In addition, in the industrial vehicle 1 in which the laser scanner 11 is mounted as a safety sensor, the laser scanner 11 provided as a safety sensor can be used as a sensor for self-position estimation.

Further, in the industrial vehicle 1 according to the first embodiment, the laser scanner 11 is attached to the lower side of the vehicle main body.

In this manner, obstacles present on the traveling plane can be easily detected to increase safety.

In addition, when the laser scanner 11 is provided on the lower side of the vehicle main body 1A, a temporary object such as another industrial vehicle or goods can be easily detected, but the accuracy of self-position estimation using the point cloud data may deteriorate. However, in the present embodiment, as described above, self-position estimation can be compensated by the self-position estimation using the visual field image in a case where the number of pieces of valid point cloud data does not satisfy a predetermined number. Thus, accurate self-position estimation can be achieved even when the laser scanner 11 is provided on the lower side of the vehicle main body 1A.

In the industrial vehicle 1 according to the first embodiment, the camera 12 is attached to be capable of imaging the area above the vehicle main body 1A.

With this configuration, the frequency at which a temporary object (another industrial vehicle or goods) is included in the visual field image can be reduced. Therefore, the accuracy of self-position estimation using the visual field image can be further increased.

Second Embodiment

Next, a position estimation device according to a second embodiment and an industrial vehicle including this position estimation device will be described with reference to FIGS. 7 to 9.

Processing Flow of Control Device

Figure 7:
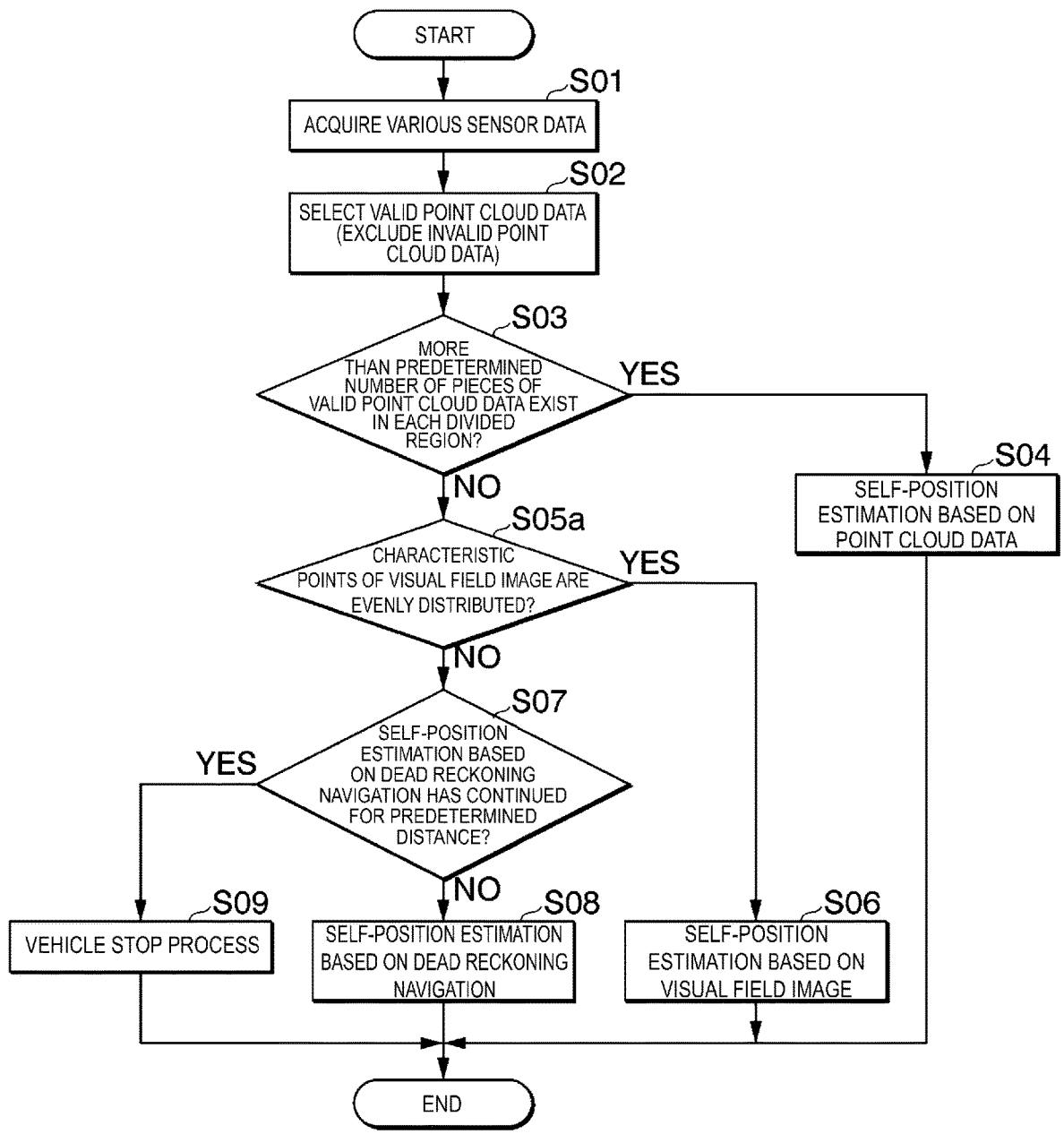
FIG. 7 is a view illustrating the processing flow of the control device according to an embodiment.

FIG. 7 is a view illustrating the processing flow of a control device according to the second embodiment.

Figure 8:
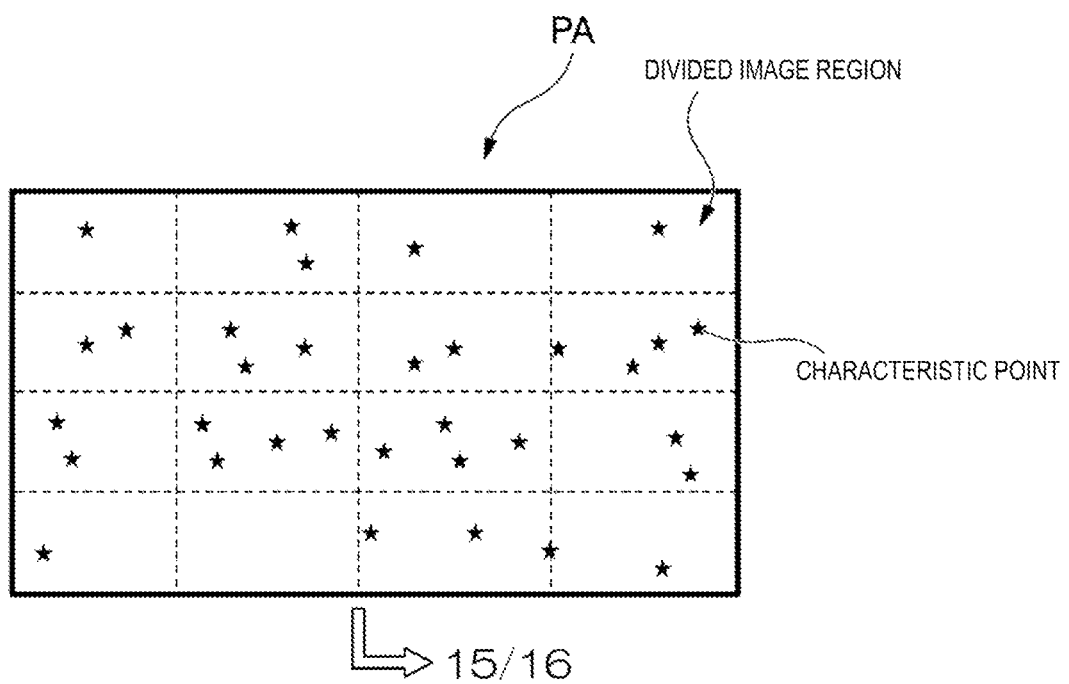
FIG. 8 is a view for describing processing of the control device according to an embodiment.
Figure 9:
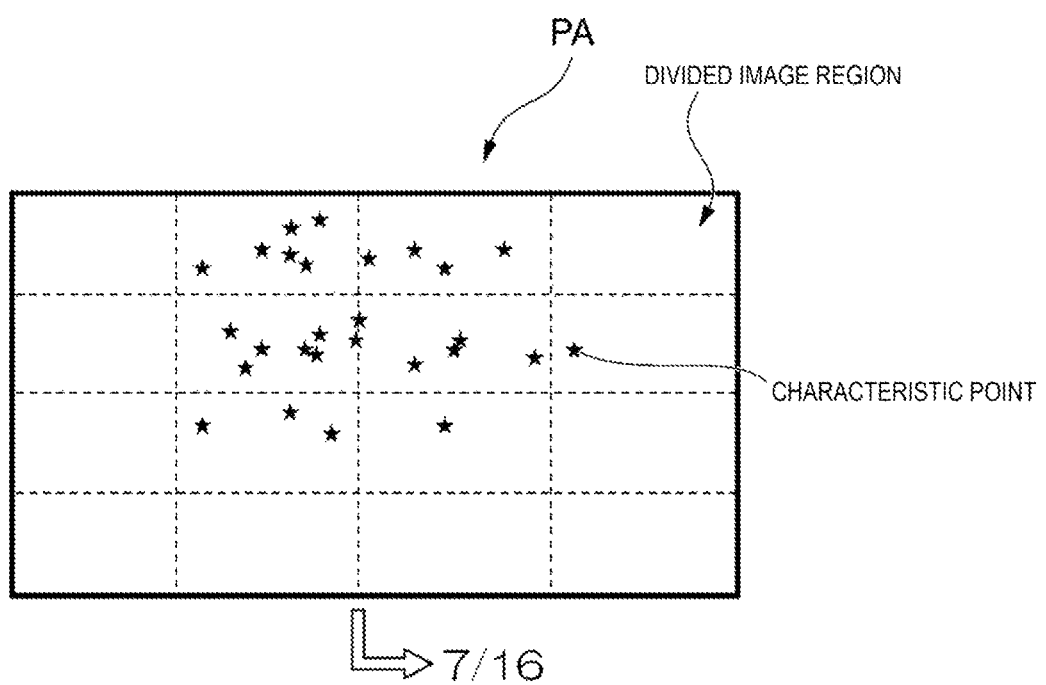
FIG. 9 is a view for describing processing of the control device according to an embodiment.

FIGS. 8 and 9 are views for describing processing of the control device according to the second embodiment.

Similar to the first embodiment, the processing flow illustrated in FIG. 7 is iterated during travel of the industrial vehicle 1.

In the processing flow illustrated in FIG. 7, the process of step S05 in the process flow (FIG. 3) of the first embodiment is substituted with the process of step S05a.

Specifically, when determining whether to perform self-position estimation by using the visual field image, the second determination unit 1003 according to the second embodiment determines whether the characteristic points of the visual field image acquired in step S01 are evenly distributed (step S05a).

Hereinafter, the process of step S05a will be described in detail with reference to FIGS. 8 and 9.

For example, in a case of a visual field image PA illustrated in FIG. 8, the characteristic points are included in fifteen divided image regions among sixteen divided image regions divided into a lattice shape. On the other hand, in a case of a visual field image PB illustrated in FIG. 9, the characteristic points are included in only seven divided image regions among the sixteen divided image regions divided into a lattice shape.

In this manner, the second determination unit 1003 determines whether the characteristic points of the visual field image are evenly distributed based on the ratio of the number of divided image regions including the characteristic points to the total number (sixteen) of divided image regions. For example, when a threshold value for the determination is $\frac{1}{2}$, the second determination unit 1003 determines that the characteristic points are evenly distributed for the visual field image PA, and determines that the characteristic points are not evenly distributed for the visual field image PB.

Returning to FIG. 7, in a case where the characteristic points of the visual field image are evenly distributed (step S05a; YES), the estimation unit 1004 performs self-position estimation using the visual field image after determining that accurate self-position estimation is possible based on the visual field image (step S06).

On the other hand, in a case where the characteristic points of the visual field image are not evenly distributed (step S05a; NO), the estimation unit 1004 performs self-position estimation by dead reckoning navigation (autonomous navigation) using the internal field sensor 13 after determining that accurate self-position estimation is not possible based on the visual field image.

Operational Effects

As described above, the position estimation device 100A according to the second embodiment estimates the position of the industrial vehicle 1 by using the visual field image in a case where the characteristic points extracted from the visual field image are evenly distributed.

On the other hand, the position estimation device 100A estimates the position of the industrial vehicle 1 by using the detection value of the internal field sensor 13 mounted in the industrial vehicle 1 in a case where the characteristic points extracted from the visual field image are not evenly distributed.

In a case where the characteristic points reflected in the visual field image are biased on the visual field image, the accuracy of matching the characteristic points with the characteristic point map information M2 decreases, and the self-position may be erroneously recognized. In light of this, the above-described configuration can increase the estimation accuracy of the self-position using the visual field image.

Third Embodiment

Next, a position estimation device according to a third embodiment and an industrial vehicle including this position estimation device will be described with reference to FIG. 10.

Figure 10:
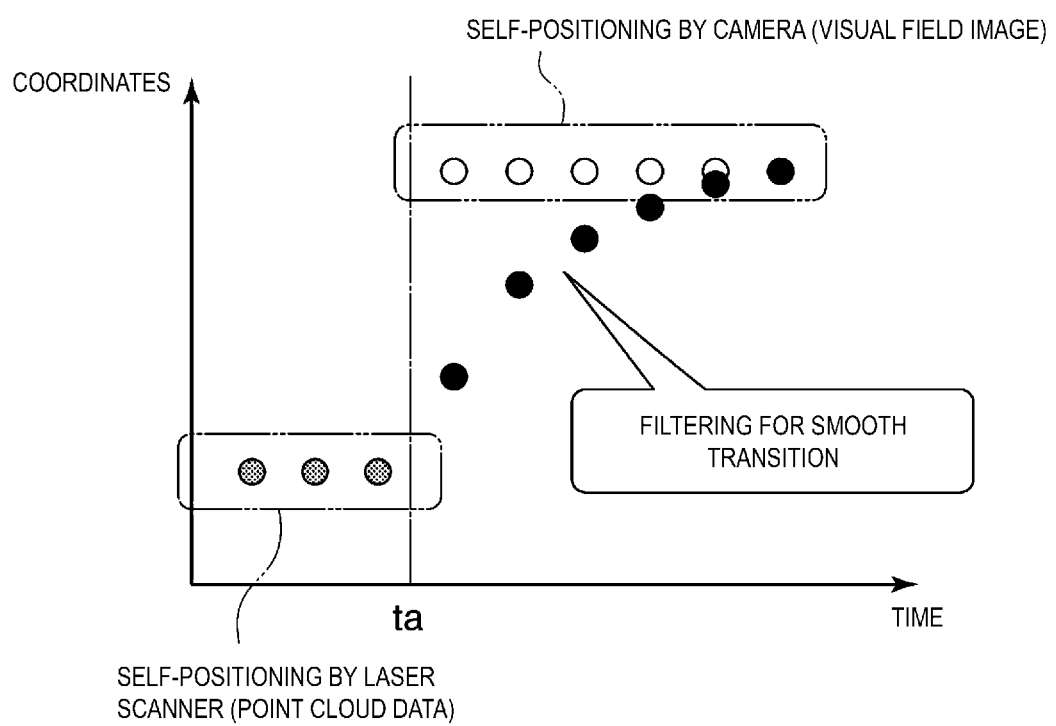
FIG. 10 is a view for describing a function of a position estimation device according to an embodiment.

FIG. 10 is a view for describing a function of the position estimation device according to the third embodiment.

The estimation unit 1004 of the position estimation device 100A according to the present embodiment has the following functions in addition to the functions of the position estimation device 100A according to the first and second embodiments.

In other words, the estimation unit 1004 acts as a sensor used for self-position estimation, and causes a smoothing filter to operate on a self-position estimation result when the laser scanner 11 and the camera 12 are switched.

The example illustrated in FIG. 10 is an example of a case where, at a time ta, self-position estimation performed by the laser scanner 11 is switched to self-position estimation performed by the camera 12. In this case, due to the error caused by switching the type of sensor, the self-position changes in a stepwise manner before and after the time ta. The estimation unit 1004 according to the present embodiment causes the smoothing filter to operate at the timing when the type of sensor is switched (that is, the timing when position estimation based on the valid point cloud data and position estimation based on the visual field image are switched), and smoothly transitions the change in steps.

In this manner, it is possible to suppress a discontinuous change in self-position estimation result, and it is possible to suppress the occurrence of undesirable steep steering control during autonomous travel.

In addition, in another embodiment, the estimation unit 1004 may perform the same filtering process at the timing of switching the position estimation based on the valid point cloud data and the position estimation based on the dead reckoning navigation, or at the tuning of switching the position estimation using the visual field image and the position estimation based on the dead reckoning navigation.

Fourth Embodiment

Next, a position estimation device according to a fourth embodiment and an industrial vehicle including this position estimation device will be described with reference to FIG. 11.

Figure 11:
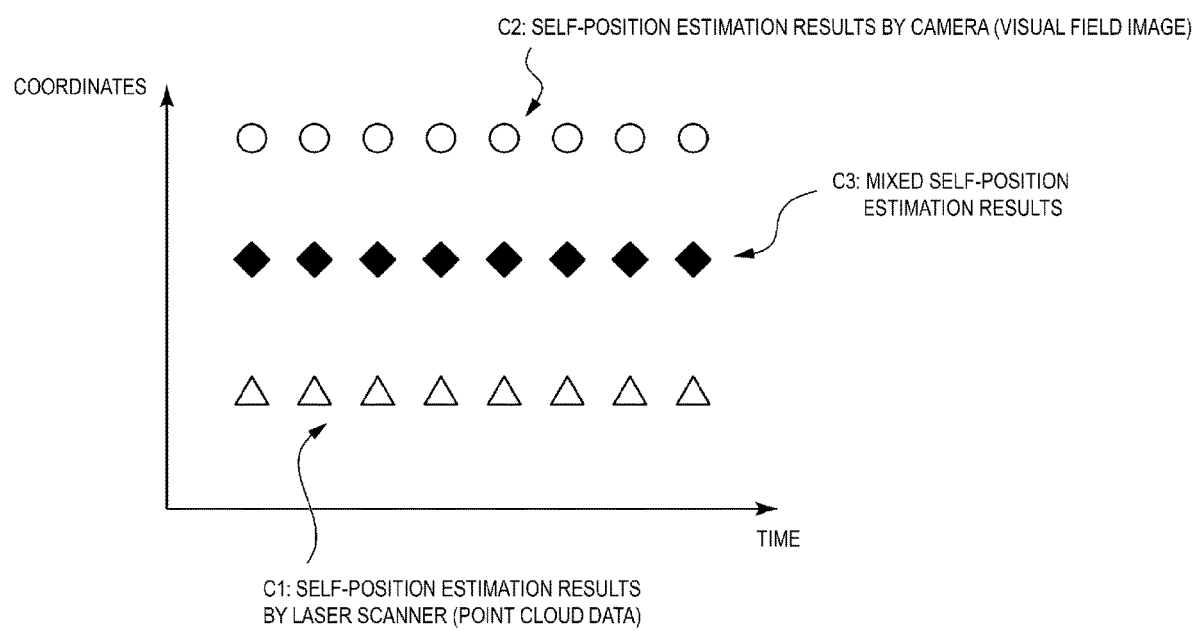
FIG. 11 is a view for describing a function of the position estimation device according to an embodiment.

FIG. 11 is a view for describing a function of the position estimation device according to the fourth embodiment.

The estimation unit 1004 of the position estimation device 100A according to the first to third embodiments is described as performing self-position estimation while alternately selecting the type of sensor (the laser scanner 11 and the camera 12) in accordance with the situation. On the other hand, as illustrated in FIG. 11, the position estimation device 100A according to the fourth embodiment calculates a result (hereinafter, also described as "mixed self-position estimation result C3") obtained by mixing a self-position estimation result C1 obtained by using the laser scanner 11 (point cloud data) and a self-position estimation result C2 obtained by using the camera 12 (visual field image) at a predetermined ratio. The position estimation device 100A according to the present embodiment outputs the mixed self-position estimation result C3 calculated in this manner as the position of the industrial vehicle 1.

In this manner, it is possible to perform self-position estimation that is more robust to unexpected disturbances than that in a case where self-position estimation is performed with only one sensor.

Further, the position estimation device 100A according to the fourth embodiment may dynamically change the mixing ratio of the self-position estimation result C1 obtained by using the laser scanner 11 and the self-position estimation result C2 obtained by using the camera 12, in accordance with the situation. For example, in the estimation unit 1004 according to a modification of the present embodiment, when the number of pieces of valid point cloud data included in the divided regions R1 to R3 (refer to FIG. 5) is large, the mixing may be performed such that the weight of the self-position estimation result C1 relatively increases, and when the number of pieces of valid point cloud data included in the divided regions R1 to R3 is small, the mixing may be performed such that the weight of the self-position estimation result C2 relatively increases.

In addition, in the estimation unit 1004, when the previous self-position is not included in the camera-usable region A1 (refer to FIG. 6), the mixing may be performed such that the weight of the self-position estimation result C1 relatively increases, and when the previous self-position is included in the camera-usable region A1 (refer to FIG. 6), the mixing may be performed such that the weight of the self-position estimation result C2 relatively increases.

Other Modifications

Details have been described above for the position estimation device 100A, the control device 10, and the industrial vehicle 1 according to the first to fourth embodiments, but the specific aspects thereof are not limited, and a variety of design changes and the like can be added within a scope not departing from the gist of the disclosure.

The camera 12 according to the first embodiment is attached to face the area immediately above the vehicle main body 1A, but other embodiments are not limited to this aspect. For example, the camera 12 according to another embodiment may be attached to face an area diagonally above the vehicle main body 1A. In addition, for example, in a case where sufficient position estimation accuracy can be ensured even when a temporary object is included in the visual field image, the camera 12 may be attached to face the horizontal direction of the vehicle main body 1A. Furthermore, the camera 12 may be an omnidirectional camera or the like.

The position estimation device according to the first embodiment has been described as being mounted for the purpose of controlling travel of the industrial vehicle 1 (unmanned forklift) that travels autonomously, but other embodiments are not limited to this aspect.

In another embodiment, the position estimation device 100A may be mounted on a manned forklift that is ridden by a person boards and performs a driving operation to record the history of travel paths, for example.

The position estimation device 100A according to another embodiment may be provided with both the technical features according to the first to third embodiments (alternatively selecting function) and the technical features according to the fourth embodiment (the function of mixing at a predetermined ratio). In this case, the position estimation device 100A may be configured to switch which function is enabled, depending on the operation of the operator or the like.

In the above-described embodiment, the course of various processes of the position estimation device 100A and the control device 10 are stored in a computer readable recording medium in the form of a program, and each of the above-described processes is performed by a computer reading and executing this program. Examples of the computer readable recording medium include magnetic disks, magneto-optical disks, CD-ROMs, DVD-ROMs, and semiconductor memories. Also, this computer program may be distributed to the computer on a communication circuit, and the computer that receives this distribution may execute the program.

The program may be a program for realizing some of the functions described above. In addition, the functions as described above may be realized in combination with a program already stored on the computer system, namely, a so-called differential file (differential program).

In the foregoing, certain embodiments of the disclosure have been described, but all of these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

Notes

The position estimation device, the control device, the industrial vehicle, the logistics support system, the position estimation method, and the program described in each of the embodiments are understood as follows, for example.

(1) According to a first aspect, there is provided the position estimation device 100A for estimating the position of the industrial vehicle 1 equipped with the laser scanner 11 capable of acquiring the point cloud data by scanning the laser beam and the camera 12 capable of acquiring the image in the predetermined direction, the position estimation device 100A including: the acquisition unit 1000 configured to acquire the point cloud data and the image; the estimation unit 1004 configured to estimate the position of the industrial vehicle 1 based on at least one of the point cloud data and the image; and the extraction unit 1001 configured to extract, from the point cloud data, the valid point cloud data that is usable for estimating the position. In a case where a number of pieces of the valid point cloud data is equal to or greater than a predetermined number, the estimation unit 1004 estimates the position of the industrial vehicle by using the valid point cloud data, and in a case where a number of pieces of the valid point cloud data is less than the predetermined number, the estimation unit estimates the position of the industrial vehicle by using the image.

(2) In the position estimation device 100A according to a second aspect, the estimation unit 1004 estimates, for each of the plurality of regions formed by dividing the scanning range of the laser beam, the position of the industrial vehicle 1 by using the valid point cloud data in a case where the number of pieces of the valid point cloud data belonging to each region is equal to or greater than the predetermined number.

(3) In the position estimation device 100A according to a third aspect, the extraction unit 1001 excludes the point cloud data derived from an object that is only temporarily present from the point cloud data, and extracts remaining point cloud data as the valid point cloud data.

(4) In the position estimation device 100A according to a fourth aspect, in a case where the number of pieces of the valid point cloud data is less than the predetermined number and a previous estimated position belongs to the predefined camera-usable region A1, the estimation unit 1004 estimates the position of the industrial vehicle 1 by using the image.

(5) In the position estimation device 100A according to a fifth aspect, the estimation unit 1004 changes the camera-usable region A1 depending on the time of day.

(6) In the position estimation device 100A according to a sixth aspect, in a case where the number of pieces of the valid point cloud data is less than the predetermined number and the previous estimated position does not belong to the predefined camera-usable region A1, the estimation unit 1004 estimates the position of the industrial vehicle 1 by using the detection value of the internal field sensor 13 mounted in the industrial vehicle 1.

(7) In the position estimation device 100A according to a seventh aspect, in a case where the number of pieces of the valid point cloud data is less than the predetermined number and characteristic points extracted from the image are evenly distributed, the estimation unit 1004 estimates the position of the industrial vehicle 1 by using the image.

(8) In the position estimation device 100A according to an eighth aspect, in a case where the number of pieces of the valid point cloud data is less than the predetermined number and the characteristic points extracted from the image are not evenly distributed, the estimation unit 1004 estimates the position of the industrial vehicle 1 by using the detection value of the internal field sensor 13 mounted in the industrial vehicle 1.

(9) In the position estimation device 100A according to a ninth aspect, the estimation unit 1004 determines whether the characteristic points are evenly distributed based on the number of divided image regions including the characteristic points, the divided image regions being formed by dividing the image into a predetermined number.

(10) In the position estimation device 100A according to a tenth aspect, the estimation unit 1004 performs a process of smoothly transitioning a position estimation result in a case where position estimation based on the valid point cloud data and position estimation based on the image are switched.

(11) In the position estimation device 100A according to an eleventh aspect, the estimation unit 1004 estimates the position of the industrial vehicle 1 by using the result of mixing, at a predetermined ratio, the position estimation result based on the valid point cloud data and the position estimation result based on the image.

(12) According to a twelfth aspect, there is provided the position estimation device 100A for estimating the position of the industrial vehicle 1 equipped with the laser scanner 11 capable of acquiring the point cloud data by scanning the laser beam and the camera 12 capable of acquiring the image in the predetermined direction, the position estimation device 100A including: the acquisition unit 1000 configured to acquire the point cloud data and the image; the estimation unit 1004 configured to estimate the position of the industrial vehicle 1 based on at least one of the point cloud data and the image; and the extraction unit 1001 configured to extract, from the point cloud data, the valid point cloud data that is usable for estimating the position. The estimation unit 1004 estimates the position of the industrial vehicle 1 by using the result of mixing, at a predetermined ratio, the position estimation result based on the valid point cloud data and the position estimation result based on the image.

(13) In the position estimation device 100A according to a thirteenth aspect, the estimation unit 1004 dynamically changes the ratio in accordance with a situation.

(14) In the position estimation device 100A according to a fourteenth aspect, the estimation unit 1004 performs mixing such that the weight of the position estimation result C1 based on the valid point cloud data relatively increases when a previous self-position is not included in a predetermined camera-usable region A1, and performs mixing such that the weight of the position estimation result C2 based on the image relatively increases when the previous self-position is included in the camera-usable region A1.

(15) According to a fifteenth aspect, there is provided a control device 10 for controlling autonomous travel of the industrial vehicle 1, the control device including: the position estimation device 100A according to any one of (1) to (14); and the steering unit 1005 configured to cause the industrial vehicle 1 to travel along a predetermined path based on the estimation result of the position.

(16) In the control device 10 according to a sixteenth aspect, the steering unit 1005 stops autonomous travel of the industrial vehicle in a case where an obstacle is detected in the travel direction based on the point cloud data.

(17) According to a seventeenth aspect, there is provided an industrial vehicle 1 including: the control device 10 according to (15) or (16).

(18) In the industrial vehicle 1 according to an eighteenth aspect, the laser scanner 11 is attached to the lower side of the vehicle main body 1A.

(19) In the industrial vehicle 1 according to a nineteenth aspect, the camera 12 is attached to be capable of imaging the area above the vehicle main body 1A.

(20) According to a twentieth aspect, there is provided the logistics support system 9 including: the industrial vehicle 1 according to (17) to (19); and the host device 2 configured to hold the management information indicating the location of each industrial vehicle and the placement position of luggage at a current time.

(21) According to a twenty-first aspect, there is provided a position estimation method for estimating the position of the industrial vehicle 1 equipped with the laser scanner 11 capable of acquiring the point cloud data by scanning the laser beam and the camera 12 capable of acquiring the image in the predetermined direction, the method including: a step of acquiring the point cloud data and the image; a step of estimating the position of the industrial vehicle 1 based on at least one of the point cloud data and the image; and a step of extracting, from the point cloud data, the valid point cloud data that is usable for estimating the position. In the step of estimating the position, the position of the industrial vehicle 1 is estimated by using the valid point cloud data in a case where the number of pieces of the valid point cloud data is equal to or greater than a predetermined number, and the position of the industrial vehicle is estimated by using the image in a case where the number of pieces of the valid point cloud data is less than the predetermined number.

(22) According to a twenty-second aspect, there is provided a program that causes a computer in the position estimation device 100A for estimating the position of the industrial vehicle 1 equipped with the laser scanner 11 capable of acquiring the point cloud data by scanning the laser beam and the camera 12 capable of acquiring the image in the predetermined direction, to execute a step of acquiring the point cloud data and the image, a step of estimating the position of the industrial vehicle 1 based on at least one of the point cloud data and the image, and a step of extracting, from the point cloud data, the valid point cloud data that is usable for estimating the position, in which, in the step of estimating the position, the position of the industrial vehicle 1 is estimated by using the valid point cloud data in a case where the number of pieces of the valid point cloud data is equal to or greater than a predetermined number, and the position of the industrial vehicle 1 is estimated by using the image in a case where the number of pieces of the valid point cloud data is less than the predetermined number.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A position estimation device for estimating a position of an industrial vehicle equipped with a laser scanner capable of acquiring point cloud data by scanning a laser beam and a camera capable of acquiring an image in a predetermined direction, the position estimation device comprising:
    an acquisition unit configured to acquire the point cloud data and the image;
    an estimation unit configured to estimate the position of the industrial vehicle based on at least one of the point cloud data or the image; and
    an extraction unit configured to extract, from the point cloud data, valid point cloud data that is usable for estimating the position of the industrial vehicle,
    wherein, in a case where a number of pieces of the valid point cloud data is equal to or greater than a predetermined number, the estimation unit is configured to estimate the position of the industrial vehicle using the valid point cloud data and in a case where the number of pieces of the valid point cloud data is less than the predetermined number and characteristic points extracted from the image are evenly distributed, the estimation unit is configured to estimate the position of the industrial vehicle using the image.

2. The position estimation device according to claim 1, wherein
    the estimation unit is configured to estimate, for each of a plurality of regions defined by dividing a scanning range of the laser beam, the position of the industrial vehicle using the valid point cloud data in a case where a number of pieces of the valid point cloud data belonging to each of the plurality of regions is equal to or greater than the predetermined number.

3. The position estimation device according to claim 1, wherein
    the extraction unit is configured to exclude object point cloud data derived from an object that is only temporarily present from the point cloud data, and extract remaining point cloud data as the valid point cloud data.

4. The position estimation device according to claim 1, wherein
in a case where the number of pieces of the valid point cloud data is less than the predetermined number and a previous estimated position of the industrial vehicle belongs to a camera-usable region, the estimation unit is configured to estimate the position of the industrial vehicle using the image.

5. The position estimation device according to claim 4, wherein
the estimation unit is configured to change the camera-usable region depending on a time of day.

6. The position estimation device according to claim 4, wherein
in a case where the number of pieces of the valid point cloud data is less than the predetermined number and the previous estimated position of the industrial vehicle does not belong to the camera-usable region, the estimation unit is configured to estimate the position of the industrial vehicle using a detection value of an internal field sensor of the industrial vehicle.

7. The position estimation device according to claim 1, wherein
in a case where the number of pieces of the valid point cloud data is less than the predetermined number and the characteristic points extracted from the image are not evenly distributed, the estimation unit is configured to estimate the position of the industrial vehicle using a detection value of an internal field sensor of the industrial vehicle.

8. The position estimation device according to claim 1, wherein
the estimation unit is configured to determine whether the characteristic points extracted from the image are evenly distributed based on a number of divided image regions including the characteristic points extracted from the image, the divided image regions being defined by dividing the image into a predetermined number.

9. The position estimation device according to claim 1, wherein
in a case where position estimation based on the valid point cloud data and position estimation based on the image are switched, the estimation unit is configured to perform a process of smoothly transitioning a position estimation result.

10. A position estimation device for estimating a position of an industrial vehicle equipped with a laser scanner capable of acquiring point cloud data by scanning a laser beam and a camera capable of acquiring an image in a predetermined direction, the position estimation device comprising:
an acquisition unit configured to acquire the point cloud data and the image;
an estimation unit configured to estimate the position of the industrial vehicle based on at least one of the point cloud data or the image; and
an extraction unit configured to extract, from the point cloud data, valid point cloud data that is usable for estimating the position of the industrial vehicle,
wherein the estimation unit is configured to:
estimate the position of the industrial vehicle using a result of mixing, at a ratio, a position estimation result based on the valid point cloud data and a position estimation result based on the image; and
perform mixing such that: (i) a weight of the position estimation result based on the valid point cloud data relatively increases when a previous self-position of the industrial vehicle is not included in a camera-usable region; and (ii) a weight of the position estimation result based on the image relatively increases when the previous self-position of the industrial vehicle is included in the camera-usable region.

11. The position estimation device according to claim 10, wherein
the estimation unit is configured to dynamically change the ratio in accordance with a situation.

12. A control device for controlling autonomous travel of an industrial vehicle, the control device comprising:
the position estimation device of claim 1; and
a steering unit configured to cause the industrial vehicle to travel along a predetermined path based on an estimation result of the position of the industrial vehicle.

13. An industrial vehicle comprising:
the control device of claim 12.

14. The industrial vehicle according to claim 13, wherein the laser scanner is attached to a lower side of a vehicle main body.

15. The industrial vehicle according to claim 13, wherein the camera is attached to the industrial vehicle so as to be capable of imaging an area above a vehicle main body.

16. A logistics support system comprising:
the industrial vehicle of claim 13; and
a host device configured to hold management information indicating a location of the industrial vehicle and a placement position of goods at a current time.

17. A position estimation method for estimating a position of an industrial vehicle equipped with a laser scanner capable of acquiring point cloud data by scanning a laser beam and a camera capable of acquiring an image in a predetermined direction, the position estimation method comprising:
acquiring the point cloud data and the image;
estimating the position of the industrial vehicle based on at least one of the point cloud data or the image; and
extracting, from the point cloud data, valid point cloud data that is usable for estimating the position of the industrial vehicle,
wherein the position of the industrial vehicle is estimated using the valid point cloud data in a case where a number of pieces of the valid point cloud data is equal to or greater than a predetermined number, and the position of the industrial vehicle is estimated using the image in a case where the number of pieces of the valid point cloud data is less than the predetermined number and characteristic points extracted from the image are evenly distributed.

18. A non-transitory computer readable medium storing a program that causes a computer, in a position estimation device for estimating a position of an industrial vehicle equipped with a laser scanner capable of acquiring point cloud data by scanning a laser beam and a camera capable of acquiring an image in a predetermined direction, to execute:
acquiring the point cloud data and the image;
estimating the position of the industrial vehicle based on at least one of the point cloud data or the image; and
extracting, from the point cloud data, valid point cloud data that is usable for estimating the position of the industrial vehicle, wherein, the position of the industrial vehicle is estimated using the valid point cloud data in a case where a number of pieces of the valid point cloud data is equal to or greater than a predetermined number, and the position of the industrial vehicle is estimated using the image in a case where the number of pieces of the valid point cloud data is less than the predetermined number and characteristic points extracted from the image are evenly distributed.

19. A control device for controlling autonomous travel of an industrial vehicle, the control device comprising:
the position estimation device of claim 10; and
a steering unit configured to cause the industrial vehicle to travel along a predetermined path based on an estimation result of the position of the industrial vehicle.

* * * * *